(12) United States Patent
Surnilla et al.

(10) Patent No.: US 6,594,985 B2
(45) Date of Patent: Jul. 22, 2003

(54) EXHAUST GAS AFTERTREATMENT DEVICE EFFICIENCY ESTIMATION

(75) Inventors: Gopichandra Surnilla, West Bloomfield, MI (US); Grant Alan Ingram, West Lafayette, IN (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/884,338

(22) Filed: Jun. 19, 2001

(65) Prior Publication Data

US 2003/0000202 A1 Jan. 2, 2003

(51) Int. Cl.[7] ................................................. F01N 3/00
(52) U.S. Cl. ............................ 60/277; 60/274; 60/295; 60/297
(58) Field of Search ........................ 60/277, 276, 295, 60/297, 274, 285, 286

(56) References Cited

U.S. PATENT DOCUMENTS

| | | | |
|---|---|---|---|
| 5,259,189 A | * 11/1993 | Baier et al. | .............. 60/274 |
| 5,267,472 A | 12/1993 | Schneider et al. | |
| 5,410,873 A | * 5/1995 | Tashiro | .............. 60/276 |
| 5,540,047 A | * 7/1996 | Dahlheim et al. | .............. 60/274 |
| 5,602,737 A | 2/1997 | Sindano et al. | |
| 5,713,199 A | 2/1998 | Takeshima et al. | |
| 5,743,084 A | 4/1998 | Hepburn | |
| 5,778,666 A | 7/1998 | Cullen et al. | |
| 5,832,722 A | 11/1998 | Cullen et al. | |
| 5,894,725 A | 4/1999 | Cullen et al. | |
| 6,012,282 A | * 1/2000 | Kato et al. | .............. 60/274 |
| 6,125,629 A | 10/2000 | Patchett | |
| 6,309,536 B1 | * 10/2001 | Inagaki et al. | .............. 205/781 |
| 6,327,848 B1 | * 12/2001 | Poggio et al. | .............. 60/276 |
| 6,408,615 B1 | * 6/2002 | Hahn | .............. 60/274 |

* cited by examiner

Primary Examiner—Thomas Denion
Assistant Examiner—Binh Tran
(74) Attorney, Agent, or Firm—Julia Voutyras; Allan J. Lippa

(57) ABSTRACT

A method for monitoring efficiency of an exhaust gas aftertreatment device is presented. The efficiency is inferred from the amount of fuel required to perform purge of the device after it has been saturated with exhaust gas components such as NOx and oxygen to a predetermined level. The level of saturation is determined from the amount of tailpipe emissions as indicated by the tailpipe exhaust gas sensor. This method improves precision in determining device efficiency and therefore eliminates unnecessary sulfur purges and improves fuel economy. Also, better emission control is achieved since the tailpipe exhaust gas sensor allows closed loop monitoring of NOx emissions and prevents the device from overfilling.

22 Claims, 4 Drawing Sheets

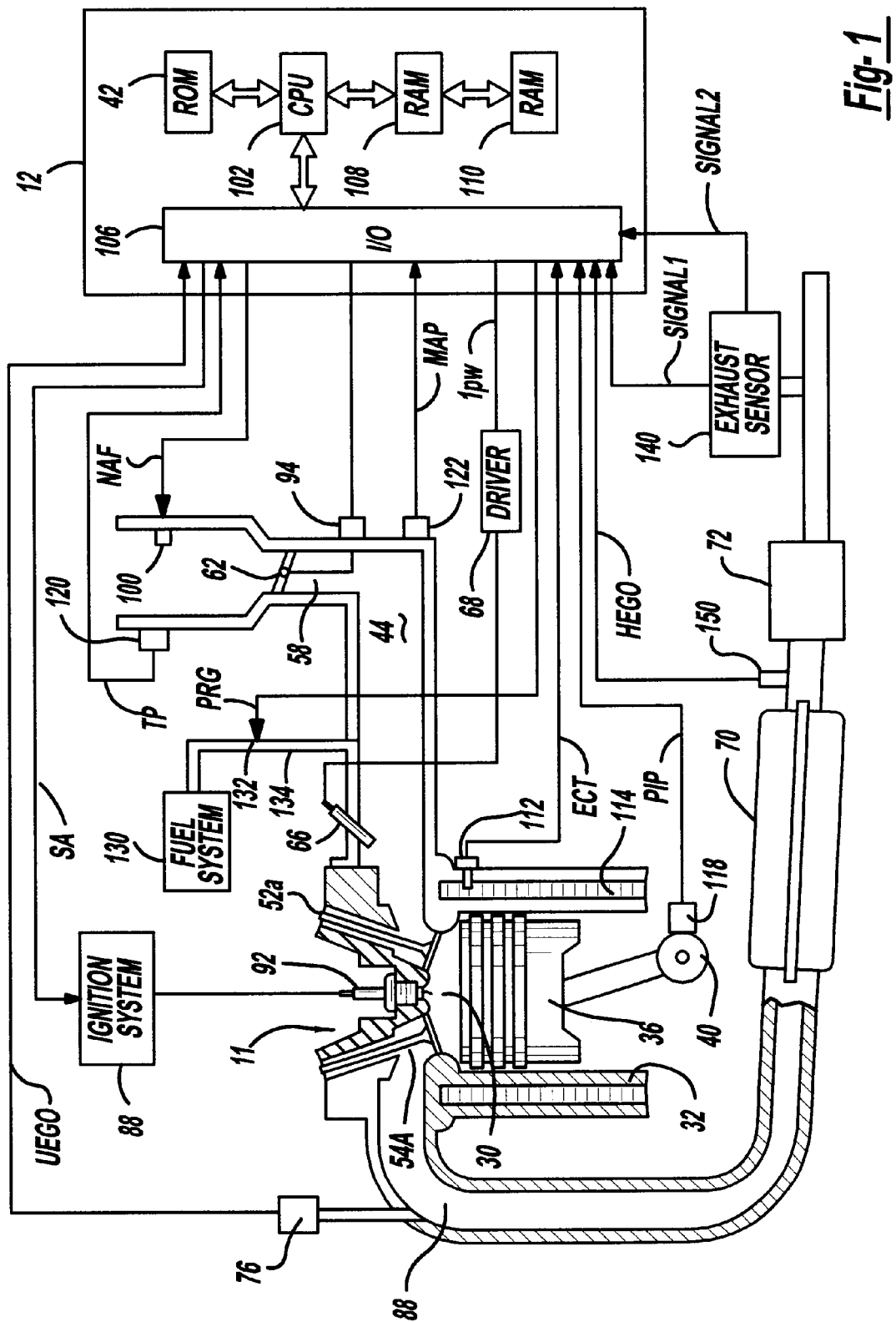

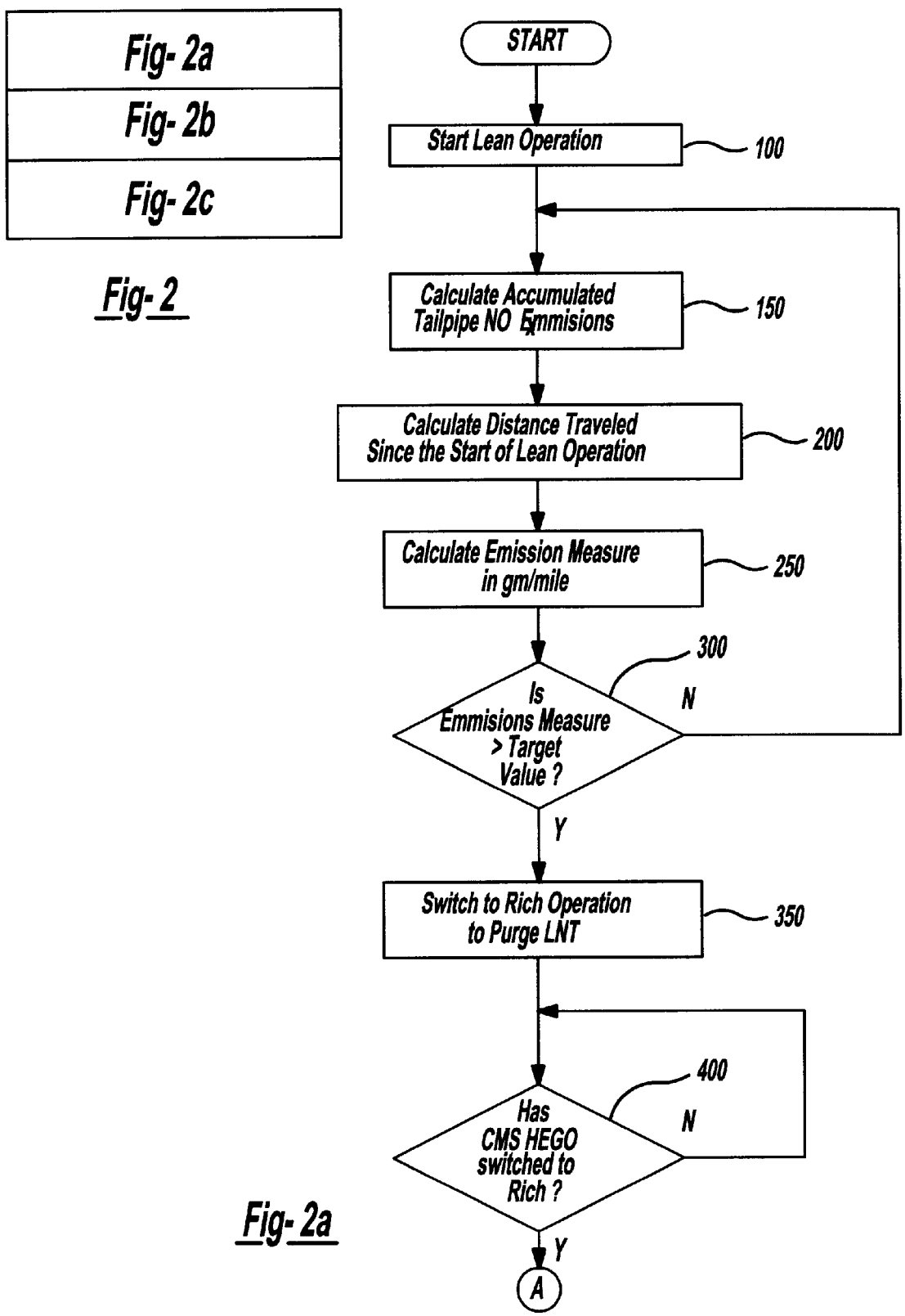

under embodiments of the present invention is described below. In the following description, various operations and parameters are described with respect to a representative engine.

EXHAUST GAS AFTERTREATMENT DEVICE EFFICIENCY ESTIMATION

FIELD OF INVENTION

The present invention relates to a system and a method for estimating efficiency of an exhaust gas aftertreatment device and, more particularly, to estimating an exhaust gas component storage capacity of a Lean NOx Trap coupled downstream of an internal combustion engine.

BACKGROUND OF THE INVENTION

Internal combustion engines are typically coupled to an emission control device known as a three-way catalytic converter (TWC) designed to reduce combustion by-products such as carbon monoxide (CO), hydrocarbon (HC) and oxides of nitrogen (NOx). Engines can operate at air-fuel mixture ratios lean of stoichiometry, thus improving fuel economy. For lean engine operation, an additional three-way catalyst commonly referred to as a Lean NOx Trap (LNT), is usually coupled downstream of an upstream catalytic converter. The LNT stores exhaust components, such as oxygen and NOx, during lean operation. After the LNT is filled, stored exhaust gas components are typically reduced and purged by switching to rich or stoichiometric operation, i.e., by increasing the ratio of fuel to air.

Over time, the ability of the catalyst to store exhaust gas components can decrease due to such factors as sulfur deposits (SOx) from the fuel. Therefore, when the storage capacity is sufficiently reduced, a SOx purge has to be performed. Typically, the catalyst is heated and engine air-fuel ratio is changed to rich for SOx release and reduction. Since SOx purges result in fuel economy penalties, it is desirable not to purge unnecessarily. Thus, in order to maintain adherence to emission standards and to obtain fuel economy benefits of a lean burning engine, it is desirable to monitor the efficiency of the LNT.

One method of determining the efficiency of the catalyst is by inferring it from the amount of fuel required to perform a NOx purge as described in U.S. Pat. No. 5,713,199. In particular, the method involves saturating the NOx absorbent with NOx up to a predetermined amount (based on an engine model), and allegedly calculating the amount of NOx purge fuel as the difference between total fuel required to purge the NOx absorbent of stored NOx and oxygen, and oxygen purge fuel (determined separately). The amount of NOx purge fuel is then correlated to the device's efficiency.

The inventors herein have recognized a disadvantage with this approach. Namely, the prior art method uses an engine model to determine the amount of NOx required to saturate the NOx storage device to capacity. However, different operating conditions, such as high or low humidity, may cause this amount to vary significantly. For example, at high humidity levels NOx generation rate is lower than that at low humidity. Therefore, the prior art method may indicate that the LNT is filled to capacity when that may not be the case. Since the fill level of the LNT may not be accurate, the calculated amount of purge fuel required to release and reduce stored NOx may not be accurate either. As a result, it may not be possible to precisely monitor the LNT efficiency.

SUMMARY OF THE INVENTION

In solving the above problem, a system and a method are provided for monitoring the efficiency of an exhaust gas aftertreatment device by calculating the amount of purge fuel required to release the exhaust gas components stored in the device during lean operation.

In carrying out the above solution, features and advantages of the present invention, a system and a method for monitoring en efficiency of an exhaust gas aftertreatment device disposed in an exhaust passage of an internal combustion engine, the device having a sensor coupled downstream of it, include operating the engine at an air-fuel mixture lean of stoichiometry; indicating that the device has stored more than a preselected quantity of an exhaust gas component based on an output of the sensor; in response to said indication, switching engine operation to an air-fuel ratio rich of stoichiometry to release said stored exhaust gas components from the device; and calculating an amount of said stored exhaust gas components stored in the device based on an amount of fuel required to complete said release.

The present invention provides a number of advantages. For example, the present invention is much more precise at estimating the efficiency of the LNT since it allows filling the LNT with oxidants to a known level by monitoring the output of the sensor coupled downstream of the LNT, as opposed to the prior art method of assuming the fill level of the LNT based on an engine model. Also, the estimate is made more accurate by the fact that less error is introduced by calculating the fuel required to purge all stored oxidants from the LNT as opposed to the prior art method of calculating NOx and oxygen purge fuel separately. The improved precision will prevent unnecessary purges allowing for more lean running time, and increased fuel economy.

Yet another advantage of the present invention is that monitoring, rather than assuming, the state of the LNT prevents overfilling it with oxidants and possibly releasing some in the atmosphere. Therefore, better emission control is achieved.

The above advantages and other advantages, objects and features of the present invention will be readily apparent from the following detailed description of the preferred embodiments when taken in connection with the accompanying drawings.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein:

FIG. 1 is a block diagram of an internal combustion engine illustrating various components related to the present invention.

DESCRIPTION OF PREFERRED EMBODIMENT(S)

Figure 2B:
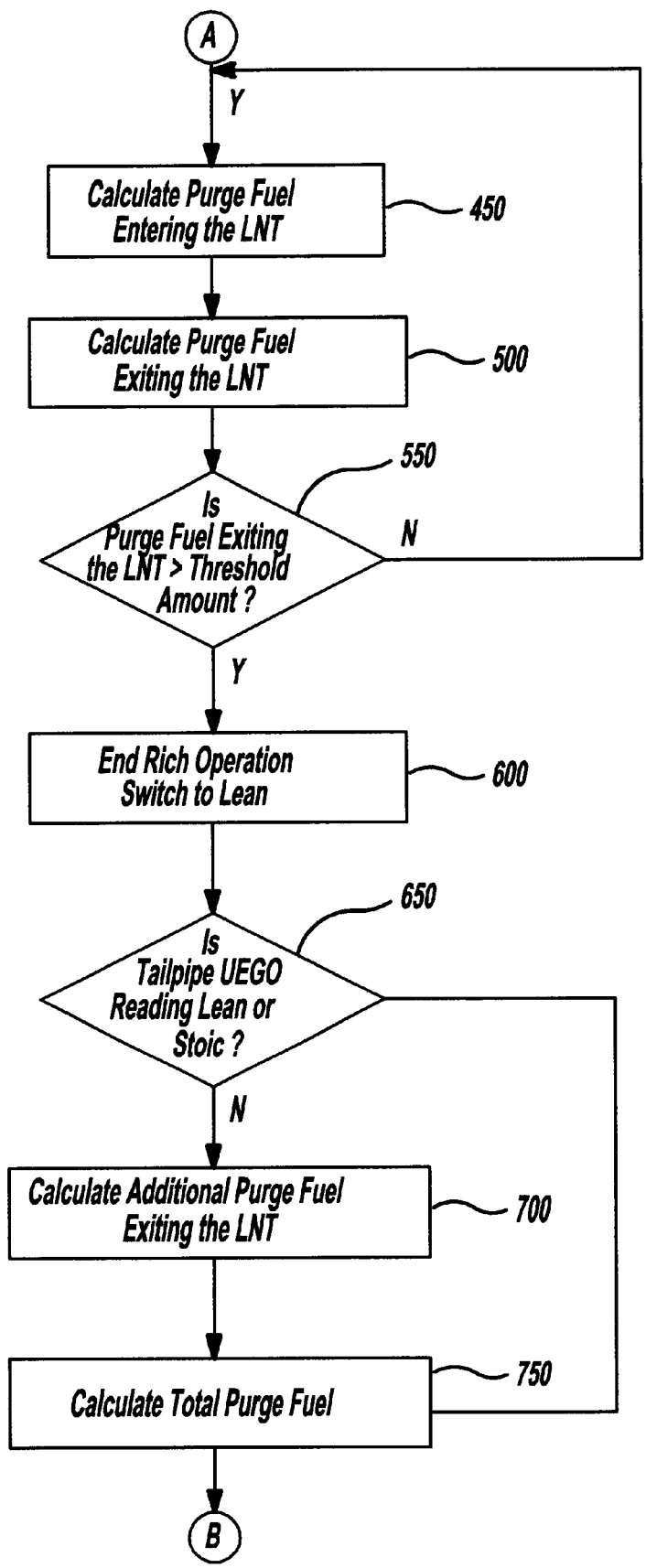
FIG. 2 is a block diagram of the embodiment in which the invention is used to advantage.

As will be appreciated by those of ordinary skill in the art, the present invention is independent of the particular underlying engine technology and configuration. As such, the present invention may be used in a variety of types of internal combustion engines, such as conventional engines, in addition to direct injection stratified charge (DISC) or direct injection spark ignition engines (DISI).

A block diagram illustrating an engine control system and method for a representative internal combustion engine according to the present invention is shown in FIG. 1. Preferably, such an engine includes a plurality of combustion chambers, only one of which is shown, and is controlled by electronic engine controller 12. Combustion chamber 30 of engine 10 includes combustion chamber walls 32 with piston 36 positioned therein and connected to crankshaft 40. In this particular example, the piston 30 includes a recess or bowl (not shown) for forming stratified charges of air and fuel. In addition, combustion chamber 30 is shown communicating with intake manifold 44 and exhaust manifold 48 via respective intake valves 52a and 52b (not shown), and exhaust valves 54a and 54b (not shown). A fuel injector 66 is shown directly coupled to combustion chamber 30 for delivering liquid fuel directly therein in proportion to the pulse width of signal fpw received from controller 12 via conventional electronic driver 68. Fuel is delivered to the fuel injector 66 by a conventional high-pressure fuel system (not shown) including a fuel tank, fuel pumps, and a fuel rail.

Intake manifold 44 is shown communicating with throttle body 58 via throttle plate 62. In this particular example, the throttle plate 62 is coupled to electric motor 94 such that the position of the throttle plate 62 is controlled by controller 12 via electric motor 94. This configuration is commonly referred to as electronic throttle control, (ETC), which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas sensor 76 is shown coupled to exhaust manifold 48 upstream of catalytic converter 70. In this particular example, sensor 76 is a universal exhaust gas oxygen (UEGO) sensor, also known as a proportional oxygen sensor. The UEGO sensor generates a signal whose magnitude is proportional to the oxygen level (and the air-fuel ratio) in the exhaust gases. This signal is provided to controller 12, which converts it into a relative air-fuel ratio. Advantageously, signal UEGO is used during feedback air-fuel ratio control in to maintain average air-fuel ratio at a desired air-fuel ratio as described later herein. In an alternative embodiment, sensor 76 can provide signal EGO, exhaust gas oxygen (not shown), which indicates whether exhaust air-fuel ratio is lean or rich of stoichiometry. In another alternate embodiment, the sensor 76 may comprise one of a carbon monoxide (CO) sensor, a hydrocarbon (HC) sensor, and a NOx sensor that generates a signal whose magnitude is related to the level of CO, HC, NOx, respectively, in the exhaust gases. Those skilled in the art will recognize that any of the above exhaust gas sensors may be viewed as an air-fuel ratio sensor that generates a signal whose magnitude is indicative of the air-fuel ratio measured in exhaust gases.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel layers are thereby formed. The stratum closest to the spark plug contains a stoichiometric mixture or a mixture slightly rich of stoichiometry, and subsequent strata contain progressively leaner mixtures. In the homogeneous mode, controller 12 activates fuel injector 66 during the intake stroke so that a substantially homogeneous air-fuel mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30.

An additional split mode of operation, wherein additional fuel is injected during the exhaust stroke while operating in the stratified mode, is available. An additional split mode of operation wherein additional fuel is injected during the intake stroke while operating in the stratified mode is also available, where a combined homogeneous and split mode is available.

Lean NOx Trap 72 is shown positioned downstream of catalytic converter 70. Both devices store exhaust gas components, such as NO and oxidants, when engine 10 is operating lean of stoichiometry. The stored exhaust gas components are subsequently reacted with HC and other reductant and are catalyzed during a purge cycle when controller 12 causes engine 10 to operate in either a rich mode or a near stoichiometric mode.

Exhaust gas oxygen sensor 150 also known as a catalyst monitoring sensor (CMS) is shown coupled to exhaust manifold 48 between the catalytic converter 70 and the NOx trap 72. In this particular example, sensor 150 provides signal HEGO to controller 12, and essentially serves as a switch providing information as to whether the air-fuel mixture is lean or rich at the mid-bed location.

Controller 12 is shown in FIG. 1 as a conventional microcomputer including but not limited to: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a NOx/UEGO sensor located downstream of the LNT. It produces two output signals. Both first output signal (SIGNAL1) and second output signal (SIGNAL2) are received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where $NO_x$ is decomposed and measured by a second pumping current using the predetermined level. Nitrogen oxide concentration can then be indicated based on this second pumping current. In an alternative embodiment, a separate NOx sensor could be used in conjunction with an air-fuel sensor, which could be a UEGO or a HEGO sensor.

Figure 2C:
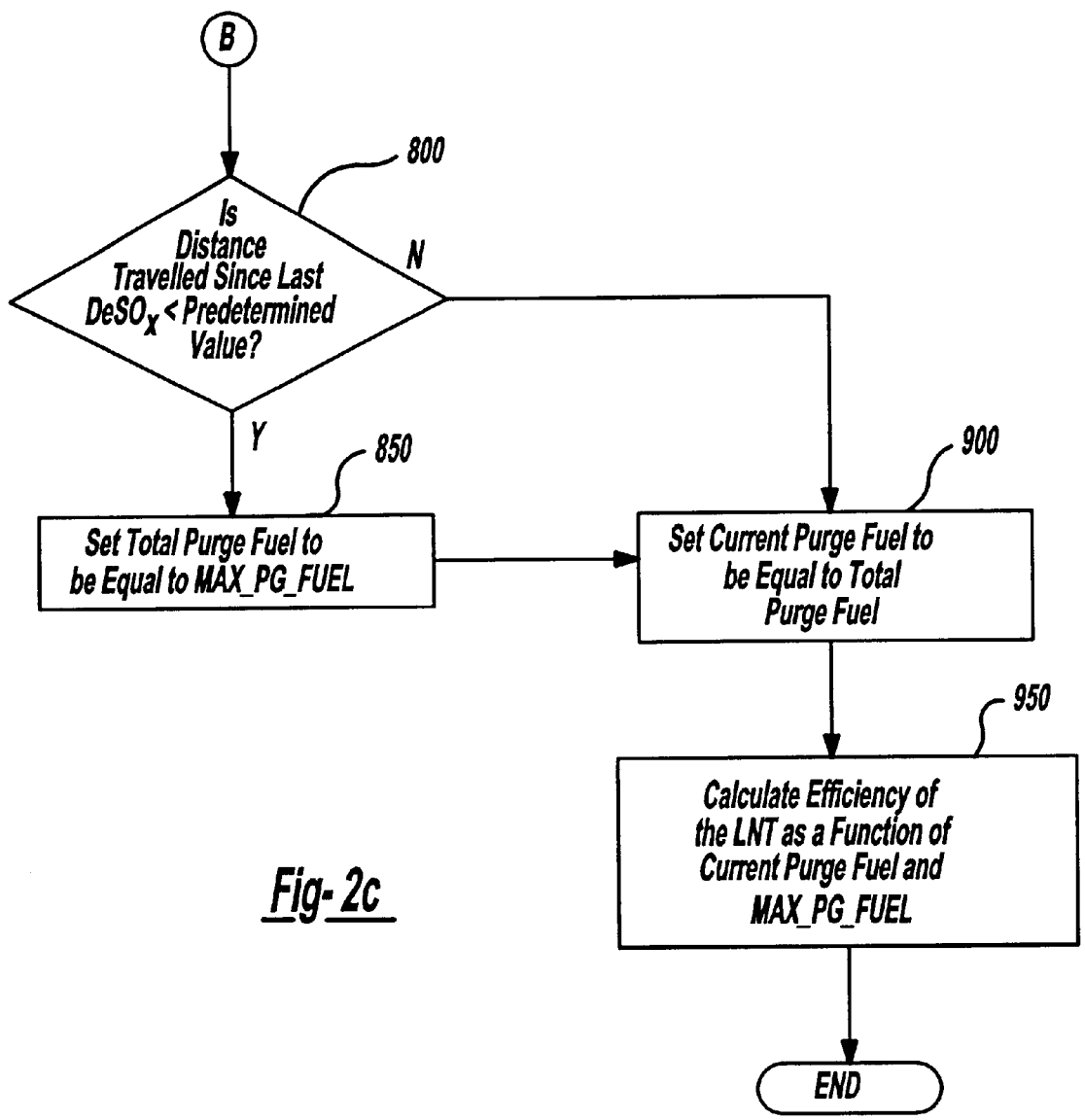

The diagram in FIG. 2 generally represents operation of one embodiment of a system or method according to the present invention. As will be appreciated by one of ordinary skill in the art, the diagram may represent one or more of any number of processing strategies such as event-driven, interrupt-driven, multi-tasking, multi-threading, and the like. As such, various steps or functions illustrated may be performed in the sequence illustrated, I parallel, or in some cases omitted. Likewise, the order of processing is not necessarily required to achieve the objects, features and advantages of the invention, but is provided for ease of illustration and description. Although not explicitly illustrated, one of ordinary skill in the art will recognize that one or more of the illustrated steps or functions may be repeatedly performed depending on the particular strategy being used.

Referring now to FIG. 2, the routine begins in step 100 wherein the engine is operated rich is order to purge any stored exhaust gas components from the catalyst thus starting with a known state of the device, and lean operation commences. Next, in step 150, an accumulated measure TP_NOx_INT representing the total tailpipe NOx emissions (in grams) since the start of lean operation is determined based upon the adjusted output signal TP_NOx generated by the NOx sensor 140 according to the following equation:

$$TP\_NOx\_INT = \int_o^t TP\_NOx \, dt$$

Next, in step 200, LB_DIST_INT, the effective cumulative distance "currently" traveled by the vehicle since the start of lean operation, is determined. This information can be derived, for example, from engine speed N and selected-transmission-gear information, or from instantaneous vehicle speed, or in any other suitable manner.

The routine then proceeds to step 250 wherein emissions measure TP_NOx_GPM expressed in units of grams per-vehicle-mile traveled is calculated according to the following equation:

$$TP\_NOx\_GPM = \frac{TP\_NOx\_INT}{LB\_DIST\_INT}$$

Proceeding to step 300, a decision is made whether the emissions measure TP_NOx_GPM is greater than a predetermined constant TP_NOx_TRGT, which is target tailpipe NOx emissions. This is a calibratable value typically set as a percentage of allowable NOx tailpipe emissions, such as 80% or 0.16 gpm, for example. If the answer to step 300 is NO, i.e., the LNT is storing enough NOx to maintain below target NOx emission levels, the routine returns to step 150, and lean operation continues. If the answer to step 300 is YES, i.e., NOx emissions is exceeding a target level, which indicates that the LNT is filled to target capacity, the routine proceeds to step 350 wherein a NOx purge of the LNT is performed by switching the engine to rich mode of operation.

Next, in step 400, a determination is made whether the HEGO sensor 150 located between the TWC and the LNT has switched to indicate rich operation. This step is necessary to ensure that the rich exhaust exiting the engine is not used to purge stored oxidants from the TWC and enters the LNT. If the answer to step 400 is NO, the routine continues cycling in step 400. If the answer to step 400 is YES, indicating that the feedgas entering the LNT is indeed rich, the routine proceeds to step 450 wherein the total amount of purge fuel, FG_FUEL_SUM, is calculated according to the following equation:

$$FG\_FUEL\_SUM = \frac{453.4 \text{ gm/lb}}{60 \text{ sec/min} \cdot 14.6} \int_{start\_of\_purge}^{end\_of\_purge} Air\_Mass\_Flow \cdot \left(\frac{1 - FG\_Lambda}{FG\_Lambda}\right) dt$$

wherein Air_Mass_Flow is measured in lbs/min and FG_LAMBDA is either the actual air-fuel ratio obtained from the feedgas UEGO sensor coupled upstream of the TWC or, instead, an open loop requested air-fuel ratio value. In an alternative embodiment, the injector pulse-width information which provides a measure of the fuel injected in the cylinder in conjunction with the air mass flow rate information from the air meter can be used to calculate the amount of purge fuel entering the LNT. Proceeding now to step 500, TP_FUEL_SUM1, the amount of purge fuel exiting the LNT is calculated according to the following equation:

$$TP\_FUEL\_SUM1 = \frac{453.4 \text{ gm/lb}}{60 \text{ sec/min} \cdot 14.6} \int_{start\_of\_purge}^{end\_of\_purge} Air\_Mass\_Flow \cdot \left(\frac{1 - TP\_Lambda}{TP\_Lambda}\right) dt$$

wherein TP_Lambda is the tailpipe air-fuel ratio of the exhaust gas exiting the LNT obtained from the NOx/UEGO sensor 140.

The routine then proceeds to step 550 wherein a determination is made whether the amount of purge fuel exiting the LNT, TP_FUEL_SUM1, has exceeded a predetermined threshold amount, TPNOXPGFUEL_NX. If the answer to step 550 is NO, indicating that purge fuel is still being used to reduce stored NOx, and that the LNT is not fully purged yet, the routine returns to step 450 wherein the amounts of purge fuel entering and exiting the LNT are updated. If the answer to step 550 is YES, i.e., the purge is completed, the routine proceeds to step 600 wherein rich operation is terminated and stoic/lean air-fuel ratio is requested.

Next, the routine proceeds to step 650 wherein a determination is made whether the SIGNAL1 output of the sensor 140 is reading lean or stoic. If the answer to step 650 is NO, meaning purge fuel is still exiting the LNT, the additional purge fuel amount, TP_FUEL_SUM2 is calculated in step 700 according to the following equation:

$$TP\_FUEL\_SUM2 = \frac{453.4 \text{ gm/lb}}{60 \text{ sec/min} \cdot 14.6} \int_{end\_of\_purge}^{(end\_of\_purge)+t} Air\_Mass\_Flow \cdot \left(\frac{1 - TP\_Lambda}{TP\_Lambda}\right) dt$$

wherein t is the time it takes for the UEGO sensor to start reading stoic or lean after the end of the LNT NOx purge. The routine then proceeds to step 750 wherein the net purge fuel used, NET_PG_FUEL is calculated according to the following equation:

NET_PG_FUEL=FG_FUEL_SUM−(TP_*FUEL*_SUM1+TP_FUEL_SUM2)

In other words, the total fuel required to purge the LNT of stored NOx and oxygen is the difference between the purge fuel entering the trap and the purge fuel exiting the trap. If the answer to step 650 is YES, the routine skips step 700, and proceeds to step 750 followed by step 800. In step 800, a decision is made whether the distance traveled by the vehicle since the last desulfication event is less than or equal to a predetermined constant, which, in this example, is ten miles. Typically, this is a calibratable constant determined based on the chemical and physical properties of the LNT. If the answer to step 800 is YES, the LNT is assumed to be at its maximum efficiency, and in step 850, the amount of fuel required to purge the trap when at maximum efficiency, MAX_PG_FUEL, is set to be equal to the net purge fuel calculated in step 750. The routine then proceeds to step 900. If the answer to step 800 is NO, the routine proceeds to step 900 wherein the current purge fuel CURR_PG_FUEL is set to be equal to the latest net purge fuel used, NET_PG_FUEL, followed by step 950 wherein the efficiency of the LNT is calculated according to the following equation:

LNT_Efficiency=f(CURR_PG_FUEL/MAX_PG_FUEL)

The routine then exits. The LNT efficiency information can be used to provide feedback to the engine controller to initiate a sulfur purge of the LNT when it is determined that it is sufficiently diminished. It can also be used for compliance with OBDII monitoring.

In other words, the efficiency of the LNT is inferred from the ratio of the amount of fuel required to perform the latest purge to the amount of fuel required to purge the LNT when at top capacity (within 10 miles of latest desulfication event, in this example).

Therefore, according to the present invention, it is possible to monitor the efficiency of a three-way catalyst such as an LNT by calculating the amount of fuel required to purge it of stored oxidants after it has been filled with oxidants up to a predetermined amount as indicated by a sensor coupled downstream of it. In a preferred embodiment of the present invention, this is accomplished by performing a purge of the LNT followed by a switch to lean operation. During lean operation, the total tailpipe NOx emission per distance traveled is calculated using the output of the tailpipe NOx sensor. Once this value exceeds a target emission amount, lean operation is discontinued, and engine operation is switched to rich therefore purging the LNT of stored exhaust gas components such as NOx and oxygen. The LNT efficiency is then determined as a function of the ratio of the net fuel amount required to purge the it of stored NOx and oxygen to the net purge fuel amount when at maximum efficiency (within a predetermined traveling distance after the last desulfication event).

This concludes the description of the invention. The reading of it by those skilled in the art would bring to mind many alterations and modifications without departing from the spirit and the scope of the invention. Accordingly, it is intended that the scope of the invention be defined by the following claims:

What is claimed is:

1. A method for monitoring an efficiency of an exhaust gas aftertreatment device disposed in an exhaust passage of an internal combustion engine, the device having a sensor coupled downstream of it, the method comprising:
   operating the engine at an air-fuel mixture lean of stoichiometry;
   indicating that the device has stored more than a preselected quantity of exhaust gas components based on an output of the sensor;
   in response to said indication, switching engine operation to an air-fuel ratio rich of stoichiometry to release said stored exhaust gas components from the device; and
   calculating an amount of said stored exhaust gas components stored in the device based on an amount of fuel required to complete said release.

2. The method recited in claim 1, whereby the device has stored more than a preselected quantity of said exhaust gas components when a quantity of said exhaust gas components exiting the device is above a predetermined threshold.

3. The method recited in claim 1, wherein said amount of fuel required to complete said release of stored exhaust gas components is calculated as a difference of a purge fuel entering the device and a purge fuel exiting the device.

4. The method recited in claim 1, wherein the exhaust gas aftertreatment device is a three way catalyst.

5. The method recited in claim 1, wherein said exhaust gas components are NOx and oxygen.

6. The method recited in claim 1, further comprising performing a sulfur purge of the device when said amount of fuel is less than a predetermined value.

7. The method recited in claim 1, wherein the sensor is a NOx/UEGO sensor.

8. The method recited in claim 1, wherein the sensor is a NOx sensor.

9. The method recited in claim 8, wherein said NOx sensor is coupled to an air-fuel ratio sensor.

10. A system for monitoring an efficiency of an exhaust gas aftertreatment device disposed in an exhaust passage of a lean burn internal combustion engine, the system comprising;
    a sensor located downstream of the device; and
    a controller for reading an output of said sensor and indicating that an amount of exhaust gas components stored in the device is above a predetermined threshold based on said reading, said controller switching to an air-fuel ratio rich of stoichiometry in response to said indication to release exhaust gas components stored in the device, and calculating an amount of exrzaust gas components stored on the device based on an amount of fuel required to complete said release.

11. The system recited in claim 10, wherein said controller further provides an indication of device deterioration if said amount of fuel is below a preselected threshold.

12. The system recited in claim 10, wherein said controller further performs a sulfur purge of the device in response to said indication 13. The system recited in claim 10, wherein the exhaust gas aftertreatment device is a three-way catalyst.

14. The system recited in claim 10, wherein said sensor is an exhaust gas sensor.

15. The system recited in claim 10, wherein said sensor is a NOx sensor.

16. The system recited in claim 10, wherein said NOx sensor is further coupled to an oxygen sensor.

17. The system as set forth in claim 10, wherein said exhaust gas components comprise oxygen and NOx.

18. A method for monitoring an efficiency of an exhaust gas aftertreatment device disposed in an exhaust passage of an internal combustion engine, the device having a sensor coupled downstream of it, the method comprising:

operating the engine at an air fuel mixture lean of stoichiometry thereby storing exhaust gas components in the device;

releasing said stored exhaust gas components by switching engine operation to an air fuel mixture rich of stoichiometry when the sensor reading exceeds a predetermined threshold; and performing a sulfur purge of the device when an amount of fuel used to release said stored exhaust gas components is below a predetermined amount.

19. The method cited in claim 18, wherein the sensor is a NOx sensor.

20. The method as set forth in claim 18, wherein said stored exhaust gas components comprise NOx and oxygen.

21. The method as set forth in claim 18, wherein said amount of fuel used to complete said release of stored exhaust gas components is calculated as a difference of a purge fuel entering the device and a purge fuel exiting the device.

22. The method as set forth in claim 18, wherein said NOx sensor is further coupled to an oxygen sensor.

* * * * *